(12) United States Patent
Olander et al.

(10) Patent No.: US 9,253,948 B2
(45) Date of Patent: Feb. 9, 2016

(54) CONTINUOUS ROUND BALER WITH ADJUSTABLE SCREED

(71) Applicant: AGCO Corporation, Duluth, GA (US)

(72) Inventors: Brian D. Olander, Buhler, KS (US); Jared W. Kinder, Newtown, KS (US); Charlie O. James, Newtown, KS (US)

(73) Assignee: AGCO Corporation, Duluth, GA (US)

(*) Notice: Subject to any disclaimer, the term of this patent is extended or adjusted under 35 U.S.C. 154(b) by 164 days.

(21) Appl. No.: 14/090,210

(22) Filed: Nov. 26, 2013

(65) Prior Publication Data

US 2014/0157748 A1  Jun. 12, 2014

Related U.S. Application Data

(60) Provisional application No. 61/730,219, filed on Nov. 27, 2012.

(51) Int. Cl.
| A01D 39/00 | (2006.01) |
| A01D 43/02 | (2006.01) |
| A01D 75/00 | (2006.01) |
| A01F 15/10 | (2006.01) |
| A01F 15/07 | (2006.01) |

(52) U.S. Cl.
CPC ........... *A01F 15/106* (2013.01); *A01F 15/0705* (2013.01)

(58) Field of Classification Search
CPC ... A01F 15/10; A01F 15/106; A01F 15/0705; A01D 43/006; A01D 39/005; A01D 43/06
USPC ............................... 56/341; 100/88
See application file for complete search history.

(56) References Cited

U.S. PATENT DOCUMENTS

| | | | | |
|---|---|---|---|---|
| 2,909,989 A | * | 10/1959 | Bornzin | A01F 15/10 100/142 |
| 4,062,172 A | * | 12/1977 | Rice | A01F 15/0705 100/77 |
| 4,580,398 A | * | 4/1986 | Bruer | A01F 15/0705 100/5 |
| 5,255,501 A | * | 10/1993 | McWilliams | A01F 15/07 100/88 |
| 5,848,523 A | * | 12/1998 | Engel | A01F 15/106 100/88 |
| 6,029,434 A | * | 2/2000 | Ratzlaff | A01F 15/07 100/88 |
| 6,032,446 A | | 3/2000 | Gola et al. | |
| 6,263,650 B1 | | 7/2001 | Deutsch et al. | |
| 6,279,304 B1 | * | 8/2001 | Anstey | A01D 89/008 198/676 |
| 6,601,375 B1 | * | 8/2003 | Grahl | A01D 89/006 56/16.6 |
| 6,901,732 B2 | | 6/2005 | Bares et al. | |
| 6,948,300 B1 | * | 9/2005 | Bandstra | A01F 15/106 56/119 |
| 7,818,954 B2 | | 10/2010 | Rempe et al. | |
| 8,156,723 B1 | * | 4/2012 | McClure | A01D 89/002 56/341 |
| 8,240,117 B1 | * | 8/2012 | McClure | A01D 89/008 56/341 |
| 8,291,687 B2 | | 10/2012 | Herron et al. | |
| 8,413,414 B2 | | 4/2013 | Herron et al. | |
| 8,464,509 B2 | | 6/2013 | Herron et al. | |
| 8,544,243 B2 | | 10/2013 | Herron et al. | |

(Continued)

*Primary Examiner* — Árpád Fábián-Kovács (57) ABSTRACT

A continuous round baler system has a baler and an accumulating system. The accumulating system includes a conveyor configured to convey crop material extending from a pickup mechanism to a bale formation chamber in the baler. A screed is positioned adjacent the end of the conveyor and is configured to be movable by a lifting mechanism between a raised position and a lowered position relative to the first conveyor. In the raised position, a gap is formed between the screed and the first conveyor so that crop material passes into the bale formation chamber. In the lowered position, the gap is closed thereby preventing the crop material from passing to the baler causing the crop material to remain on the conveyor.

11 Claims, 6 Drawing Sheets

(56) References Cited

U.S. PATENT DOCUMENTS

| | | | |
|---|---|---|---|
| 2002/0095925 A1* | 7/2002 | Preheim | A01F 15/106 56/341 |
| 2004/0011016 A1* | 1/2004 | McClure | A01F 15/106 56/341 |
| 2008/0163600 A1* | 7/2008 | Schrag | A01D 89/005 56/341 |
| 2011/0023442 A1* | 2/2011 | Herron | A01F 15/0825 56/341 |
| 2012/0096827 A1* | 4/2012 | Chaney | A01F 15/0833 56/341 |
| 2012/0159918 A1* | 6/2012 | McClure | A01F 15/106 56/341 |
| 2012/0204734 A1* | 8/2012 | Reijersen Van Buuren | A01F 15/0705 100/3 |
| 2012/0304612 A1* | 12/2012 | Roberge | A01F 15/106 56/341 |
| 2013/0036921 A1* | 2/2013 | Horstmann | A01F 15/0705 100/5 |
| 2014/0237981 A1* | 8/2014 | Roberge | A01D 87/02 56/341 |

* cited by examiner

CONTINUOUS ROUND BALER WITH ADJUSTABLE SCREED

CROSS REFERENCE TO RELATED APPLICATION

This application claims priority to U.S. provisional application entitled, "Adjustable Crop Accumulating And Metering Device," having Ser. No. 61/730,219, filed Nov. 27, 2012, which is entirely incorporated herein by reference.

TECHNICAL FIELD

The present disclosure is generally related to conveyor systems and, more particularly, accumulating systems for continuous balers.

BACKGROUND

A continuously operating, round baler is designed with a front feeding accumulating chamber and a bale formation chamber (also, baling chamber). The baler forms a round bale in the bale formation chamber, and then wraps the round bale and ejects it from the bale formation chamber. While the round baler is undergoing the wrapping and ejecting cycles for the bale from the bale formation chamber, crop material gathers at the accumulator to enable the baler to maintain forward travel (hence the description, continuous round baler). One or more challenges to conventional, continuous round balers may result from the accumulating process, particularly given the differences in crop materials and/or conditions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, an accumulating method comprises conveying crop material on a rotating first conveyor past a screed toward a baler while the baler is traversing a field, the screed configured in a raised position; and obstructing the flow of the crop material to the baler by lowering the screed while the first conveyor is rotating, the obstructing implemented while the baler continues traversing the field.

DETAILED DESCRIPTION

Certain embodiments of an accumulating system and method are disclosed that cooperate with a continuous round baler to control the conveyance of crop material (e.g., material other than grain (MOG), such as biomass) to the baler. In one embodiment, an accumulating system comprises a floor conveyor and an adjustable screed, the adjustable screed serving to control the ingress of crop material (e.g., picked up by a pickup mechanism at the front of the accumulating system) into the baler as the baler traverses a field. The screed may be configured (e.g., automatically, or based on operator intervention in some embodiments) in a raised position, enabling the flow of the crop material into the baler as a bale formation process is implemented by the baler. At a time corresponding to a bale wrapping cycle (e.g., upon completion of the bale formation cycle), the screed is automatically (or based on operator intervention in some embodiments) lowered to obstruct (e.g., stop) the crop material flow into the baler, and a screed conveyor of the screed is rotated to enable the incoming crop material to build in height along the screed as the floor conveyor carries the crop material toward the baler. At a time corresponding to ejection of the wrapped bale, the screed is again raised, and the accumulated (and newly gathered) crop material is permitted to flow in a metered or adjustably-controlled manner past the screed and into the baler as the bale formation process begins.

Digressing briefly, one difficulty of conventional, continuously operating round balers is that of accumulating an adequate volume of crop material without adding a crop elevating mechanism between the pickup and an accumulating chamber. Another difficulty involves feeding the accumulated material from the accumulation area (e.g., accumulating chamber) to the bale formation chamber after the wrapped bale has exited the baler. An additional difficulty is providing an opening from the accumulator exit area to the bale formation chamber that is suited for a variety of crop materials and conditions. With certain embodiments of an accumulating system, the rotational movement of the lowered screed conveyor may be used to assist in accumulating material by turning upward, and increasing the height of, the accumulated material. When it is time to feed the accumulated material to the bale formation chamber, the screed raises off of the top surface of the floor conveyor to create an adjustable gap for crop material to travel through to reach the bale formation chamber, the adjustable gap enabling a metered or controlled flow (e.g., deliberated or stepped-raising of the screed) of the accumulated material into the baler (versus permitting the entirety of the accumulated material to come in at once, although some embodiments may permit all of the flow to come in, such as by fully raising the screed at once). At this point, the rotation of the screed conveyor and the gap between the screed and the top surface of the floor conveyor may be tailored to suit the crop type, crop yield, and/or crop conditions.

Having summarized certain features of an accumulating system of the present disclosure, reference will now be made in detail to the description of the disclosure as illustrated in the drawings. While the disclosure will be described in connection with these drawings, there is no intent to limit it to the embodiment or embodiments disclosed herein. For instance, though described in the context of a continuous round baler system, certain embodiments of the accumulating systems may be applied to other baling systems where crop accumulation control to the baler is warranted or desired. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the baler looking forwardly.

Figure 1:
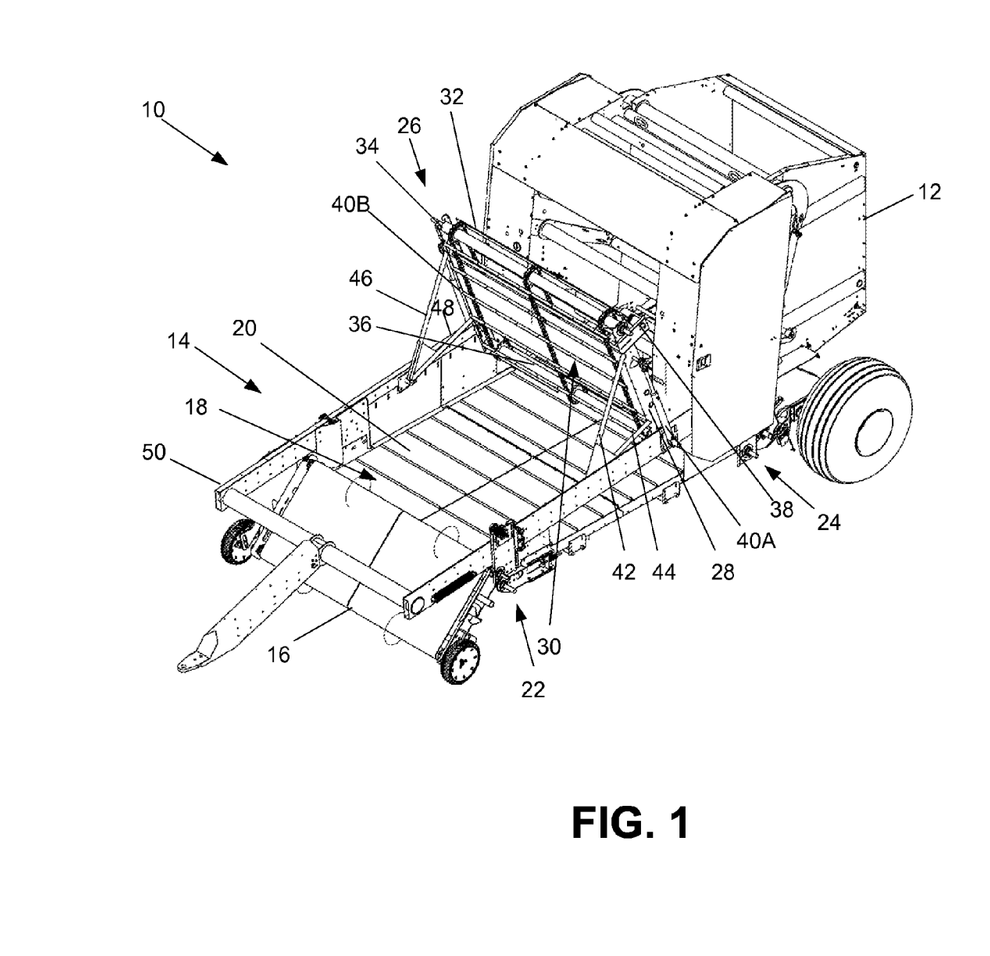
FIG. 1 is a schematic diagram in isometric view that illustrates an embodiment of an accumulating system.
Figure 2:
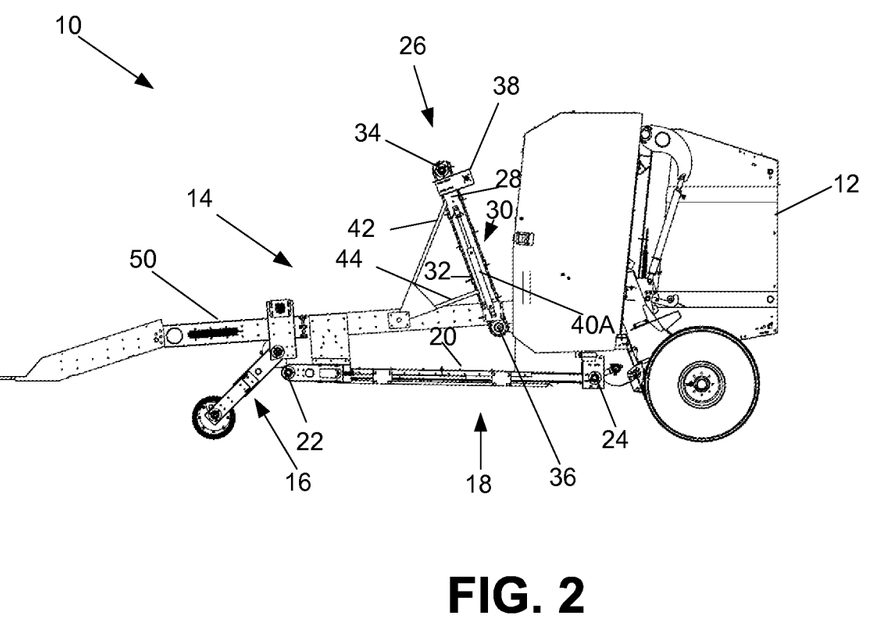
FIG. 2 is a schematic diagram that illustrates in side elevation, fragmentary, cut-away view an example embodiment of an accumulating system with a screed in a raised position.
Figure 3:
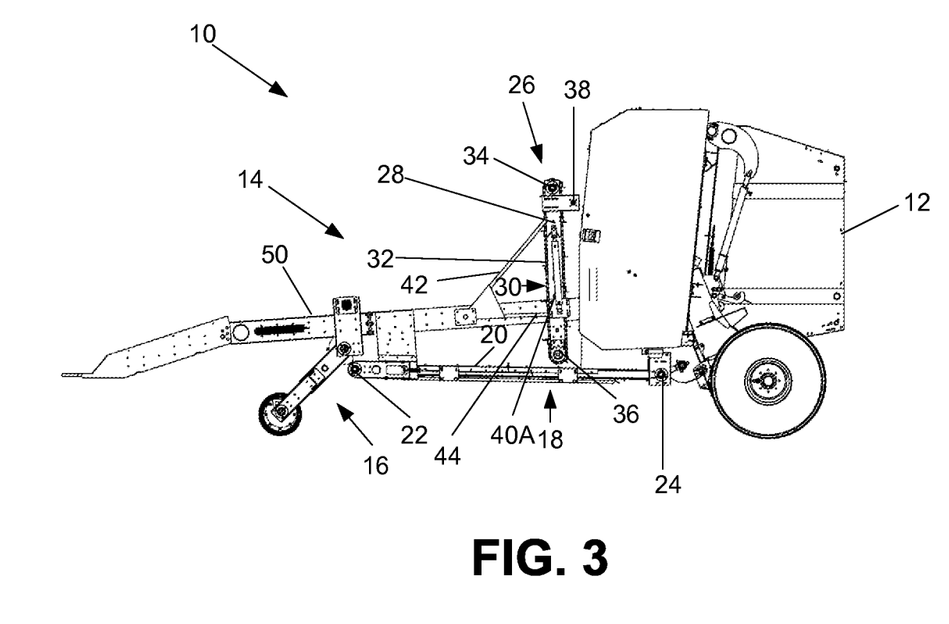
FIG. 3 is a schematic diagram that illustrates in side elevation, fragmentary, cut-away view an example embodiment of an accumulating system with a screed in a lowered position.

Reference is made to FIGS. 1-3, which illustrate an example environment, that is, a continuous round baler system 10, in which an example embodiment of an accumulating system may be implemented. One having ordinary skill in the art should appreciate in the context of the present disclosure that the example environment (continuous round baler system 10) depicted in FIGS. 1-3 is merely illustrative, and that other environments may incorporate certain embodiments of an accumulating system. The continuous round baler system 10 comprises a baler 12 and an accumulating system 14. The baler 12 is depicted as a continuous round baler (e.g., with the accumulating system 14 enabling all baler cycles or operations to form, wrap, and discharge a round bale without stopping the forward movement of the baler 12) that is towed by a towing vehicle (e.g., tractor, combine harvester, etc.) that is not shown. In some embodiments, other baler configurations may be used, including those that are self-propelled. The accumulating system 14 is configured in one embodiment with a well-known pickup mechanism 16 at the forward end of the accumulating system 14. Note that in some embodiments, the pickup mechanism 16 may be located elsewhere (and hence omitted from the accumulating system 14). For instance, the towing vehicle may be equipped with a pickup mechanism, and the gathered material may be discharged from the towing vehicle directly to the conveyor floor of the accumulating system 14.

The accumulating system 14 comprises a conveyor (e.g., also referred to herein as a first or floor conveyor) 18. The conveyor 18 comprises one or more endless belts 20 that rotate around rolls 22 and 24 on opposing ends of the conveyor 18. Note that reference herein to endless belts refers to conveying surfaces that move around the rolls 22 and 24, the conveying surfaces either integrally formed or connected (e.g., linear strips or bands that are laced or stitched or otherwise connected together or connected through an intermediate material) to provide a conveying surface that enables the movement around the rolls 22 and 24. In some embodiments, other types of conveying surfaces may be used, such as a chain and slat configuration, plural rollers, plural augers, among others. The pickup mechanism 16 gathers crop material as the baler 12 is towed (e.g., coupled to a tongue toward the front end of the accumulating system 14) in the forward direction, the gathered crop material deposited on the endless belt(s) 20. As the conveyor 18 rotates (e.g., as the endless belt(s) 20 rotate around the rolls 22 and 24), the deposited crop material is conveyed toward the baler 12.

At a location proximal to the inlet of the baler 12 is a screed 26. The screed 26 comprises a frame 28 that is substantially rectangular in form. The frame 28 supports a rotatable conveyor 30. In one embodiment, the conveyor 30 comprises a chain and slat conveying surface 32 that rotates around a screed drive sprocket 34 and an opposing idler sprocket 36. In some embodiments, sprockets 34 and/or 36 may be replaced with other types of rolls. In some embodiments, other conveying surfaces may be used, including endless belts, rolls, augers, etc. The screed 26 further comprises a drive motor 38 that drives the drive sprocket 34, which in turn causes the rotation of the conveyor 30 (e.g., the chain and slat conveying surface 32). In one embodiment, the drive motor 38 may be hydraulic, and powered by a hydraulic pump (e.g., residing in the baler 12, or on the tractor). The drive motor 38 controls the speed and/or direction of the conveyor 30. The drive motor 38 may receive control signals directly from a controller residing in the baler 12, or indirectly from a control manifold as described further below. In some embodiments, the rotation of the conveyor 30 may be in either direction (e.g., clockwise or counter-clockwise). The screed 26 further comprises one or more lifting mechanisms, such as lifting mechanisms 40A and 40B, coupled to opposing sides of the frame 28. In some embodiments, only a single lifting mechanism (e.g., 40A or 40B) may be used. The lifting mechanisms 40A and 40B may be embodied as hydraulic cylinders, although other mechanisms for raising and lowering the screed 26 may be used, including mechanically and/or electrically-based actuators and/or sub-systems. The lifting mechanisms 40A and 40B, when embodied as a hydraulic cylinder, may be powered by a hydraulic pump, as explained below. Control of the hydraulic cylinders 40A and 40B may be achieved via a flow control valve (not shown), which may be controlled via a controller residing within the baler 12. In embodiments using other types of actuators or actuating sub-systems, an electric motor or other form of mechanical drives may be used. The screed 26 also comprises plural pivoting members 42, 44 (left-side) and 46, 48 (right side). In one illustrative embodiment, the pivoting members 42 and 46 are coupled proximally to an upper edge of the frame 28 of the screed 26, and the pivoting members 44 and 48 are coupled proximally to a lower edge of the frame 28 of the screed 26. The pivoting members 42, 44, 46, and 48 are also coupled to a frame 50 (e.g., opposing inside edges of the frame 50, as shown in partial cut-away view in FIGS. 2-3) supporting the pickup mechanism 16 and the accumulating system 14. The lifting mechanisms 40A and 40B are also coupled to the frame 50 (e.g., opposing outside edges of the frame 50, as shown in FIGS. 1-3).

The pivoting members 42, 44, 46, and 48, in cooperation with the lifting mechanisms 40A and 40B, enable the raising and lowering of the screed 26, as best shown in FIGS. 2-3. For instance, a controller located in the baler 12 (or in some embodiments, located in the towing vehicle) communicates control signals to a hydraulic flow control valve (e.g., a standalone component in the baler 12 or residing within a manifold of one or more flow control valves and/or solenoid valves), as described above, which controls fluid flow to the lifting mechanisms 40A and 40B. These control signals may be communicated at different cycles or stages of the baling operations (e.g., responsive to completion of the bale forming cycle and before, or at a time corresponding to, the wrapping cycle). For instance, when the bale reaches full size in the bale formation chamber (e.g., as detected by a baler sensor and communicated to the controller), the screed 26 may be lowered, as shown in FIG. 3, closing the opening to the bale formation chamber to avoid mixing the incoming crop material with the formed bale undergoing (or about to undergo) a wrapping operation. When the bale in the bale formation chamber has been wrapped and ejected, the screed 26 may be raised off of the floor of the conveyor 18, as shown in FIG. 2, providing a gap or opening (e.g., between the screed 26 and the conveyor 18) for the accumulated crop material to move into the bale formation chamber. Note that the change in fluid flow causes the lifting mechanisms 40A and 40B to raise or lower the screed 26 in cooperation with the pivoting action of the pivoting members 42, 44, 46, and 48. In some embodiments, the example screed 26 may be replaced with a structure achieving a similar function, operating in a more linear fashion (e.g., raising and lowering the screed directly up and down).

As noted above, the screed 26 is adjustable in height, ranging in one embodiment from a raised position (e.g., approximately three (3) feet above the conveyor 18, though not limited to this height), as shown in FIG. 2, to a lowered position (e.g., lightly touching the top surface of the belts 20, though other lowest positions are contemplated to be within the scope of the disclosure) as shown in FIG. 3. In some embodiments, as explained below, the screed 26 may be lowered to a defined distance above the conveyor 18, with a rotating member (not shown) disposed between, and adjacent to, the idler sprocket 36 of the screed 26 and the top surface of the belts 20. The screed 26 comprises a width of approximately the entire width of the conveyor 18, though in some embodiments, the width may be different. As explained above, crop material conveyed by the conveyor 18 passes beneath the screed 26 and is fed into the baler 12 when the screed 26 is in the raised position. Crop material is obstructed (e.g., stopped) from flowing into the baler 12 when the screed 26 is in the lowered position, enabling the accumulation of crop material between the front of the accumulating system 14 and the screed 26 as the conveyor 18 continues conveying the crop material (and as the baler 12 traverses the field).

The baler 12, as is known, forms the crop material conveyed to it by the conveyor 18 into a bale. As is well-known, the baler 12 may include bale forming mechanisms within the bale formation chamber, including a plurality of rolls (e.g., starting, lower, upper, belt tensioning, bale density, idler, etc.), bale forming belts, bale tensioning arms, bale density arms, base size sensors, among other components and/or sub-systems well-known to those having ordinary skill in the art. The baler 12 further comprises well-known componentry and/or sub-systems for bale wrapping and bale discharge operations.

The conveyor 18 and the pickup mechanism 16 may be driven by independent drive systems (partially shown) in one embodiment, though a common drive system may be used in some embodiments (not shown). For instance, a drive system for the pickup mechanism 16, as is well-known in the art, may include a hydraulic motor having a motor drive wheel. For example, the hydraulic motor may be mounted on a motor mounting plate and arranged to rotate a pickup drive wheel, which in turn rotates a pickup drive roll. Similarly, a drive system for the conveyor 18 may comprise a hydraulic motor that may also be arranged to drive a conveyor drive wheel associated with the conveyor drive roll 24. For example, for each drive system, a drive belt or chain may be looped around the drive wheel and the pickup drive wheel or the conveyor drive wheel, as applicable, so that when the drive wheel is rotated, the pickup drive wheel or the conveyor drive wheel also rotates and in turn rotates the pickup roll or the conveyor drive roll 24 via the respective drive belt. As is well-known, fluid may be provided to the hydraulic motors of each drive system, such as hydraulic motor for the drive system, by a hydraulic pump (e.g., directly, or indirectly via a flow control valve or a manifold that comprises solenoids and/or flow control valves) via hoses to provide variable (or in some embodiments, fixed) fluid flow to control (e.g., vary) the speed of the motors and the operation of the pickup mechanism 16 and the conveyor belts 20. The pump may be powered by a power takeoff (PTO) mechanism of the towing vehicle, or in some embodiments, by power generated locally (e.g., power source residing in the baler 12). It should be appreciated within the context of the present disclosure that, though a hydraulic motive force is described, other motive forces (e.g., electrical and/or mechanical) may be used in some embodiments.

The immediately aforementioned arrangement allows the movement of the conveyor belts 20 to be controlled by a controller. The controller enables the conveyor 18 to be operated in the material-conveying direction as well as in the reverse direction. The controller also enables control of the pickup mechanism 16, and of the conveyor 30 of the screed 26 and the raising and lowering of the screed 26. For instance, the controller (e.g., responsive to operator intervention or automatically based on a sensed condition and/or machine parameter) may deliver control signals to the manifold to manipulate hydraulic fluid provided to the respective motor via hoses, and thus control the respective hydraulic motor. As explained above, in some embodiments, control may be direct (e.g., bypassing the manifold).

Although the various drive and/or actuator systems have been described above using plural, independent drive systems (e.g., for powering and/or controlling the pickup mechanism 16, the conveyors 18 and 30, and the lifting mechanisms 40A and 40B), other arrangements may be provided such that fewer drive systems may be utilized. Further, though described with the controller and pump residing in the baler 12, in some embodiments one or both of these components may reside in the towing vehicle or on the conveyor assembly 14. Further description of an example round baler 12 and drive systems and associated baler controls may be found in commonly-assigned United States patent publication number 20110023442.

Figure 4A:
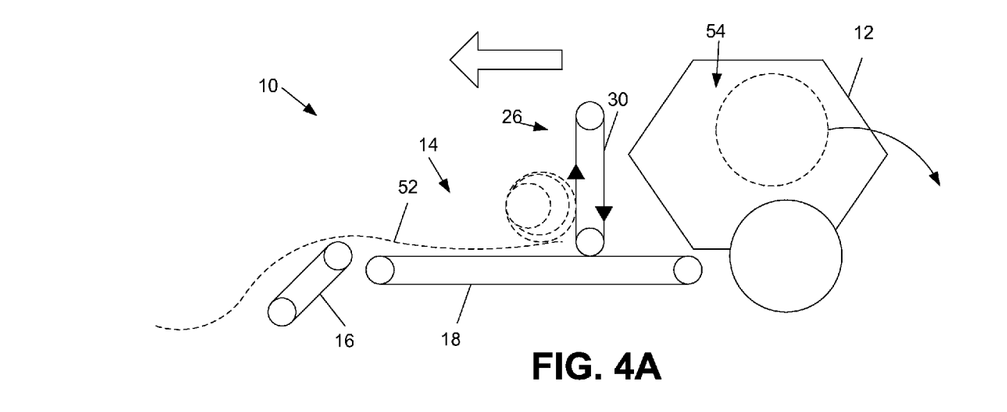
FIGS. 4A-4B are block diagrams that illustrate example processing for an embodiment of an accumulating system.
Figure 4B:
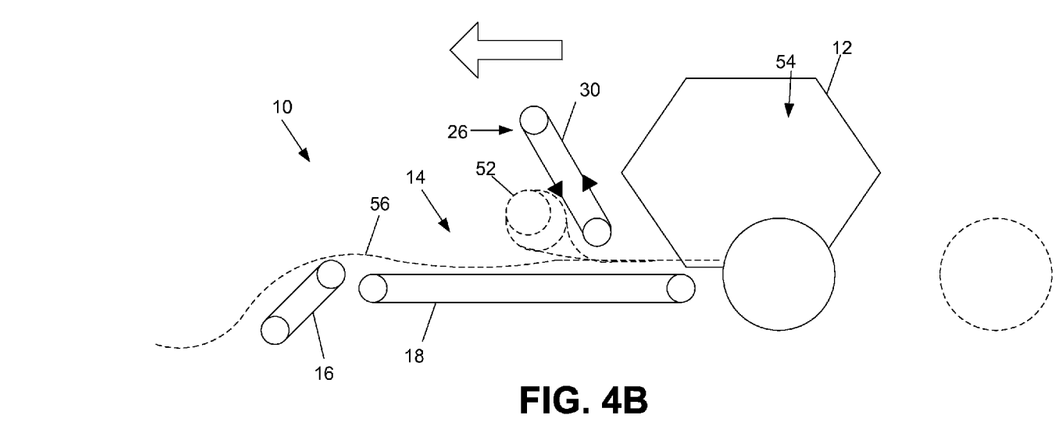

Having described the various structures of the accumulating system 14, attention is directed to FIGS. 4A-4B, which illustrate, in block diagram form, an example embodiment of an accumulating process. In particular, FIG. 4A shows a block diagram representation of select components of the continuous round baler system 10, including the baler 12 and the accumulating system 14, which in one embodiment includes the pickup mechanism 16, the screed 26, and the conveyor 18. In this depicted example, the screed 26 is in the lowered position (e.g., lowered such that there is little or no gap between the bottom edge of the screed 26 and the top surface of the conveyor 18). As shown by the arrow at the top of FIG. 4A, the continuous round baler system 10 is traversing a field during this operation, and crop material 52 is gathered at the pickup mechanism 16 and deposited on the conveyor 18. The conveyor 18 rotates to enable the flow of crop material toward the baler 12, yet since the screed 26 is lowered, the crop material 52 accumulates along the surface of the conveyor 18 between the front end of the conveyor 18 and the screed 26. In the meantime, a bale (shown by a dashed circle in the baler 12 in FIG. 4A) is formed in a bale formation chamber 54 of the baler 12 and is either undergoing wrapping or about to be ejected from the bale formation chamber 54. At the screed 26, the conveyor 30 is shown with directional arrows that illustrate the direction of rotation (e.g., clock-wise when viewed from the left perspective). In this example, the direction of rotation of the screed conveyor 30 is the same as the direction of rotation of the floor conveyor 18. In some embodiments, during this stage of the process, the floor conveyor 18 rotational speed may be reduced (relative to when feeding the crop material 52 into the baler 12), though in some embodiments, the rotational speed may remain unchanged. The incoming crop material 52 contacts the rotating screed conveyor 30, the rotation of the screed conveyor 30 causing the crop material 52 to move upward and on top of the incoming crop 52. In other words, the screed conveyor 30 rotates in an upward direction to shear off the accumulated pile of crop material 52.

At a time corresponding to (e.g., after) the bale has been wrapped and discharged (e.g., ejected) from the bale formation chamber 54 (also, referred to as the baling chamber), as indicated by the arrow located at the rear end of the baler 12, the screed 26 is raised off of the top surface of the conveyor 18, as shown in FIG. 4B. The distance the screed 26 is raised may be adjustable, based on crop type, crop yield, and/or crop conditions, enabling the metering of the flow of crop material 52, as described above, and preventing plugging the baler 12. For instance, there may be conditions when it is desirable to change the rotation of the conveyor 30 to feed the crop material 52 downward. The continuous round baler system 10 continues in its forward traversal of the field, as indicated by the arrow toward the top of FIG. 4B, and the pickup mechanism 16 continues to gather crop material 56 from the ground. The accumulating system 14, with its conveyor 18 continuing its rotation (at the same or different speed than prior to the screed 26 rising from the conveyor 18), causes the flow of the crop material 56 toward the baler 12. The raised screed 26 permits the flow of the accumulated crop material 52, as well as the crop material 56 newly gathered, past (e.g., underneath) the screed 26 and into the baler 12 as the bale formation process commences once again in the bale formation chamber 54. In some embodiments, the rotation of the screed conveyor 30 is reversed to influence the crop material 52 downward and past the screed 26, as indicated by the directional arrows on the conveyor 30. In some embodiments, the rotational speed of the screed 26 is adjustable. In some embodiments, the direction of rotation of the conveyor 30 remains unchanged (e.g., relative to the lowered position), and in some embodiments, the speed of rotation of the conveyor 30 is reduced in the raised position or the rotation of the conveyor 30 is stopped in the raised position.

In some embodiments, there may be one or more additional rotating members (e.g., roll, auger, etc.) disposed between the idler sprocket 36 (FIGS. 1-3) of the screed 26 and the conveyor 18. For instance, the screed 26 may be not be lowered to the conveyor 18 in some embodiments, but rather, lowered enough to create a gap between the screed 26 and the conveyor 18 sufficient to accommodate placement of the rotating member in the gap. In some embodiments, the screed 26 may be shorted in length, such that despite the ordinary full range of movement between the raised and lowered positions, nevertheless is short enough to permit placement of the rotating member in the gap created between the shortened screed and the conveyor 18. In one embodiment, the rotating member is coupled to the screed 26, and in some embodiments, the rotating member is separate from the screed 26 (e.g., pivotally coupled to the frame 50 and individually powered or powered by the screed components or powered elsewhere). For instance, the rotating member may be actuated by a dedicated motor (e.g., hydraulic motor) that is controlled directly or indirectly by the controller.

Figure 5A:
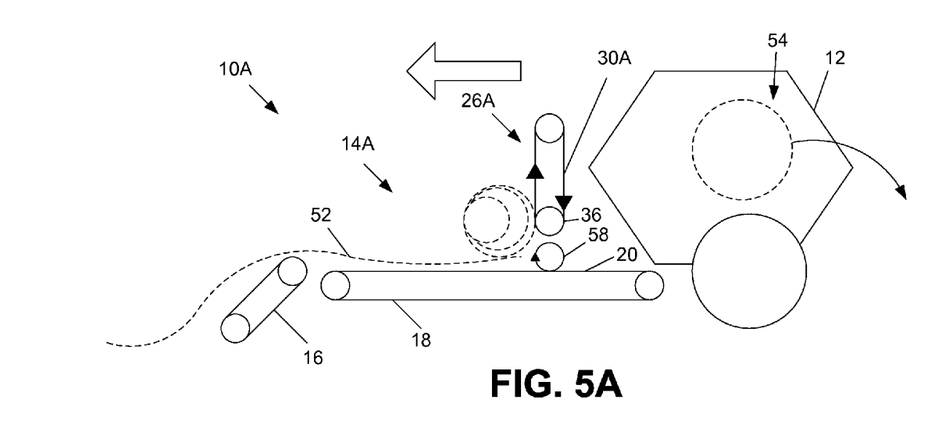
FIGS. 5A-5B are block diagrams that illustrate example processing for another embodiment of an accumulating system.
Figure 5B:
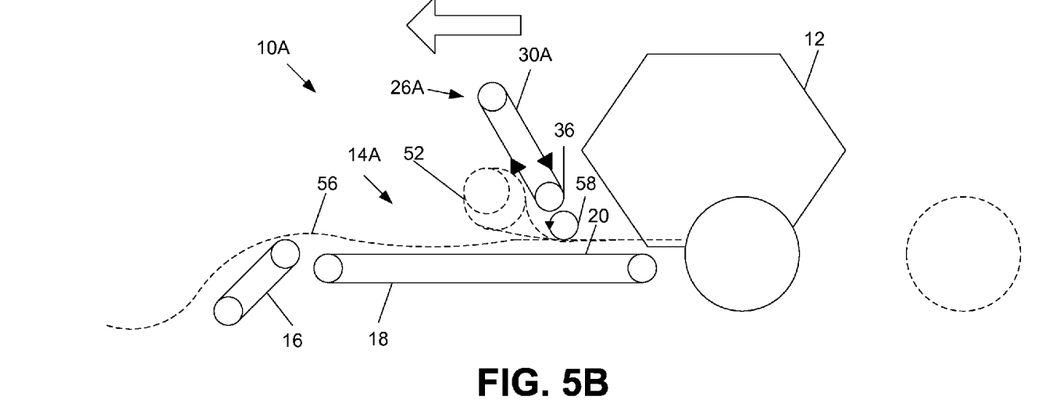

Referring now to FIGS. 5A-5B, shown is a continuous round baler system 10A having the baler 12, the pickup mechanism 16, and utilizing another embodiment of the accumulating system 14A. As indicated above, the pickup mechanism 16 may be considered a part of the accumulating system 14A in some embodiments. The accumulating system 14A comprises the conveyor 18 and a shortened screed 26A (with the understanding that restricting full movement of a normal-sized screed 26 to allow a rotating member 58 to be utilized may also be used to same or similar effect). The shortened screed 26A comprises the screed conveyor 30A and a rotating member 58. In some embodiments, the rotating member 58 may be separate from the screed 26A (e.g., pivotally or adjustably coupled to the frame 50, FIG. 1). As depicted in FIG. 5A, the rotating member 58 is embodied as a roll (e.g., smooth or rough, such as having protrusions) that is adjacent to, and located between, the idler sprocket 36 of the screed 26A and the conveyor 18 (e.g., a top surface of a conveying surface 20 of the conveyor 18). As with FIGS. 4A-4B, the continuous round baler system 10A is moving forward in a field, as depicted by the arrow at the top of FIGS. 5A-5B.

Referring in particular to FIG. 5A, the screed 26A (along with the coupled rotating member 58) is configured in the lowered position. The screed 26A comprises the conveyor 30A, shown rotating in the clock-wise direction (viewed from the left-perspective). The crop material 52 is gathered at the pickup mechanism 16, and deposited on the conveyor 18. The conveyor 18 rotates, causing the crop material 52 to be conveyed toward the baler 12. Since the screed 26A is lowered, with the rotating member 58 lightly contacting (or in some embodiments, almost contacting) the top conveying surface 20 of the conveyor 18, the crop material flow to the baler 12 is obstructed (e.g., stopped). The crop material 52 accumulates between the front of the conveyor 18 and the screed 26A. The conveyor 30A, the conveyor 18, and the rotating member 58 are all rotating in the same rotational direction (as shown by the respective directional arrows), which causes the crop material 52 to move upward against the screed 26A and back on top of the incoming crop material 52.

At a time corresponding to ejection of the formed and wrapped bale from the bale formation chamber 54, the screed 26A is raised, as shown in FIG. 5B, causing the rotating member 58 to leave a gap between the rotating member 58 and the conveyor 18 to permit the metered flow of crop material 52 and 56. For instance, as the continuous round baler system 10A continues to traverse the field, the pickup mechanism 16 gathers the crop material 56 for deposit on the rotating conveyor 18 of the accumulating system 14A. The crop material 56 is conveyed by the conveyor 18 past (e.g., underneath) the raised rotating member 58 (and hence raised screed 26A), destined for the baler 12. Likewise, the raising of the screed 26A (and rotating member 58) permits the accumulated crop material 52 to pass through the gap (e.g., underneath the rotating member 58 and on the conveying surface 20) with a destination to the baler 12. The rotation of the conveyor 30A and the conveyor 18, in one embodiment, remains in the same direction (e.g., clockwise when viewed from the left perspective) as when the screed 26A was lowered. The rotation of the rotating member 58 is in the opposing direction (counter-clockwise when viewed from the left perspective) of the conveyor 30A, which enables the rotating member 58 to facilitate the deconstruction (e.g., unraveling) of the crop material 52 as well as influencing the rearward conveyance (along with the conveyor 18) of the crop material 52 and 56.

It should be appreciated that, although the accumulating system 14 (and 14A) is described as including the various components described above, in some embodiments, there may be fewer or additional components (e.g., the pickup mechanism 16, baler 12, etc.) considered as part of the accumulating system 14.

Figure 6:
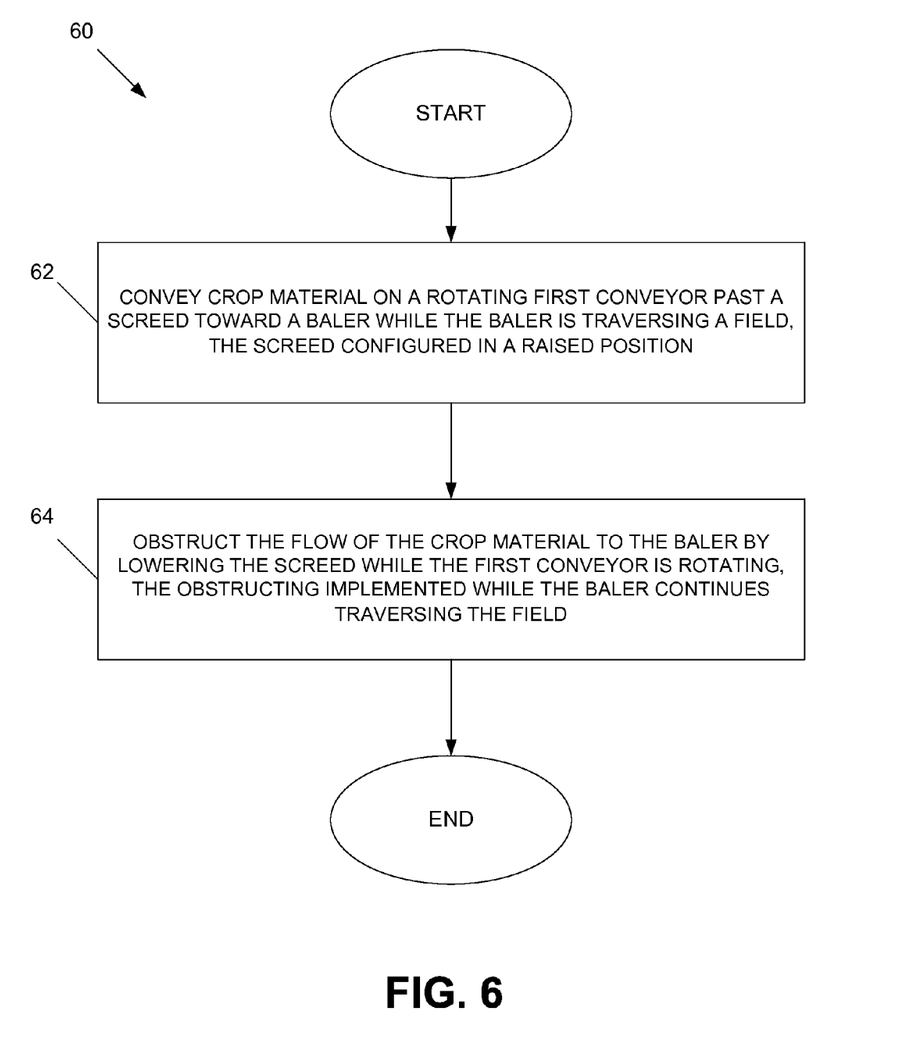
FIG. 6 is a flow diagram that illustrates an example embodiment of an accumulating method.

In view of the above description, it should be appreciated that one embodiment of an accumulating method, as depicted in FIG. 6 and denoted as method 60, comprises conveying crop material on a rotating first conveyor (e.g., the floor conveyor 18.) past a screed toward a baler while the baler is traversing a field, the screed configured in a raised position (62); and obstructing (e.g., entirely or substantially entirely)

the flow of the crop material to the baler by lowering the screed while the first conveyor is rotating, the obstructing implemented while the baler continues traversing the field (64). In some embodiments, the obstructing may be performed with a rotating member (or non-rotating in some embodiments), and in some embodiments, the obstructing may be performed with the rotating member omitted.

Note that steps in the process, and alternate implementations are included within the scope of the embodiments in which functions may be performed out of order from that shown or discussed, including substantially concurrently or in reverse order, depending on the functionality involved, and/or additional or fewer steps performed, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A continuous round baler system, comprising:
   a continuous round baler comprising a bale formation chamber;
   an accumulating system coupled to the baler, the accumulating system comprising:
   a pickup mechanism;
   a rotatable first conveyor extending from a first end adjacent the pickup mechanism to a second end adjacent the bale formation chamber, the first conveyor configured to convey crop material to the bale formation chamber of the baler;
   a screed positioned adjacent the second end of the first conveyor comprising a rotatable second conveyor, the screed configured to be movable between a raised position and a lowered position relative to the first conveyor; and
   a lifting mechanism coupled to the screed, the lifting mechanism configured to move the screed between the raised and lowered positions, wherein when the screed is in the raised position, a gap is formed between the screed and the first conveyor so that crop material conveyed by the first conveyor passes through the gap between the screed and the first conveyor and into the bale formation chamber, and when the lifting mechanism moves the screed to the lowered position, the screed closes the gap thereby enabling obstruction of the conveyed crop material to the baler so that crop material conveyed by the first conveyor remains on the first conveyor and does not enter the bale formation chamber while the baler is traversing a field.

2. The continuous round baler system of claim 1, wherein the accumulating system further comprises:
   a first frame;
   wherein the first conveyor comprises an endless, moveable first belt that wraps partially around first and second rolls that enable movement of the first belt, the first and second rolls coupled to the first frame; and
   wherein the screed is coupled to the first frame.

3. The continuous round baler system of claim 2, wherein the lift mechanism is coupled between the first frame and a frame of the screed.

4. The continuous round baler system of claim 3, further comprising plural pivot members coupled between the frame of the screed and the first frame, the pivot members enabling the movement of the screed between the raised and lowered positions.

5. The continuous round baler system of claim 2, wherein the screed comprises a drive sprocket, an idler sprocket, and a motor, the conveyor coupled to the drive sprocket and the idler sprocket, the motor coupled to the drive sprocket, the conveyor driven by the motor and the drive sprocket.

6. The continuous round baler system of claim 5, further comprising a rotating member located between, and adjacent to, the idler sprocket and a top surface of the first belt, the rotating member coupled to the first frame.

7. The continuous round baler system of claim 6, wherein the rotating member and the conveyor are rotatable in a same direction when the screed is in the lowered position.

8. The continuous round baler system of claim 6, wherein the rotating member and the conveyor are rotatable in opposing directions when the screed is in the raised position.

9. The continuous round baler system of claim 6, wherein the speed of the rotating member is adjustable between a stopped state of the rotating member and a full-speed state of the rotating member.

10. The continuous round baler system of claim 2, wherein the screed extends across substantially the entire width of the first conveyor.

11. The continuous round baler system of claim 2, wherein the lifting mechanism comprises a pair of hydraulic cylinders coupled between the screed and the first frame.

* * * * *